US010123486B2

(12) United States Patent
Reinecke et al.

(10) Patent No.: US 10,123,486 B2
(45) Date of Patent: Nov. 13, 2018

(54) FRAME FOR AGRICULTURAL HARVESTER CLEANER

(71) Applicant: CNH Industrial America LLC, New Holland, PA (US)

(72) Inventors: Clay A. Reinecke, Blue Grass, IA (US); Craig E. Murray, Davenport, IA (US); Orlin W. Johnson, Geneseo, IL (US); Kai Zhao, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 26 days.

(21) Appl. No.: 15/218,165

(22) Filed: Jul. 25, 2016

(65) Prior Publication Data

US 2017/0020071 A1     Jan. 26, 2017

Related U.S. Application Data

(60) Provisional application No. 62/196,152, filed on Jul. 23, 2015.

(51) Int. Cl.
*A01F 12/44* (2006.01)

(52) U.S. Cl.
CPC .................. *A01F 12/446* (2013.01)

(58) Field of Classification Search
CPC ..... B07B 2201/02; A01F 12/446; A01F 12/36
See application file for complete search history.

(56) References Cited

U.S. PATENT DOCUMENTS

| 2,923,409 | A | 2/1960 | Yonash | |
| 3,785,134 | A | 1/1974 | Francis et al. | |
| 4,840,728 | A * | 6/1989 | Connolly | B07B 1/46 209/397 |
| 5,112,475 | A * | 5/1992 | Henry, Jr. | B07B 1/46 160/327 |
| 6,042,055 | A | 3/2000 | Messinger | |
| 7,357,711 | B1 | 4/2008 | Matousek et al. | |
| 7,946,428 | B1 * | 5/2011 | Lane | B07B 1/4645 209/395 |
| 7,997,967 | B2 | 8/2011 | Ricketts et al. | |
| 8,376,143 | B2 * | 2/2013 | Lane | B07B 1/4645 209/395 |
| 8,556,531 | B1 | 10/2013 | Bird et al. | |
| 9,827,597 | B2 * | 11/2017 | Woodgate | B07B 1/4645 |
| 2002/0195377 | A1 * | 12/2002 | Trench | B07B 1/284 209/365.1 |
| 2015/0087364 | A1 * | 3/2015 | Adamson | A01F 12/446 460/79 |
| 2015/0087365 | A1 * | 3/2015 | Pearson | A01F 12/446 460/93 |
| 2015/0087366 | A1 * | 3/2015 | Pearson | A01F 12/446 460/95 |
| 2016/0228916 | A1 * | 8/2016 | Woodgate | B07B 1/4645 |

* cited by examiner

*Primary Examiner* — Arpad Fabian-Kovacs
(74) *Attorney, Agent, or Firm* — Patrick M. Sheldrake

(57) ABSTRACT

An agricultural harvester includes a grain processing section having a sieve assembly. The sieve assembly includes right and left frames interconnected by a cross member. The cross member has end castings securable to the right and left frame members. An elongated U-shaped sheet metal member extends between the castings. An elongated slot at each of the U-shaped sheet metal member terminates in a circular hole. The slot and circular hole accommodate variations in forming tolerances for the U-shaped sheet member and dissipate stresses.

14 Claims, 5 Drawing Sheets

FRAME FOR AGRICULTURAL HARVESTER CLEANER

This is a non-provisional application based upon U.S. provisional patent application Ser. No. 62/196,152, entitled "FRAME FOR AGRICULTURAL HARVESTER CLEANER", filed Jul. 23, 2015, which is incorporated herein by reference.

BACKGROUND OF THE INVENTION

1. Field of the Invention

The present invention relates to agricultural harvesters such as combines, and, more particularly, to sieve assemblies incorporated in the harvester crop processing section.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The upper sieve or sieve assembly usually includes right and left frames interconnected by a cross member near the forward end of the sieve assembly to provide a pivotal support that accommodates fore and aft movement as well as side to side. Significant forces are transmitted through the cross member and implementation of the cross member in sheet metal form can have an impact on long term durability. Providing a cross member with castings and sheet metal members can be a way to increase structural integrity. However, the tolerances in a bending machine relative to the tolerances in the casting can cause stresses when the channel member is fastened to the casting.

Accordingly, what is needed in the art is a configuration that minimizes stresses for a U-shaped sheet element fastening to a casting.

SUMMARY OF THE INVENTION

The invention seeks to achieve a stress free structural member formed from castings and U-shaped sheets.

In one form, the invention is a sieve assembly for an agricultural harvester, the sieve assembly formed from a right frame and a left frame interconnected by a cross frame at the forward end of the right and left frames. The cross frame includes a casting on either end for connection to the right and left frames. An elongated U-shaped sheet member is affixed to the casting, the U-shaped member having a longitudinal slot in each end for accommodating variations in geometry and fasteners connect the U-shaped sheet member to the end casting.

In another form, the invention is an agricultural harvester including a main frame, a plurality of wheels for ground movement and grain processing equipment mounted in the frame. A sieve assembly is positioned to receive the output of the grain processing equipment and includes a right frame and a left frame interconnected by a front cross frame. The cross frame includes a casting on either end for connection to the right and left frames. An elongated U-shaped sheet member is affixed to the castings, the U-shaped sheet member having a longitudinal slot in each end for accommodating variations in geometry and fasteners connect the U-shaped sheet member to the end castings.

An advantage of the present invention is a light yet structurally robust cross frame member for a sieve assembly.

Another advantage of the invention is a stress minimizing member including a casting and bent sheet metal member.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG (material other than grain) or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
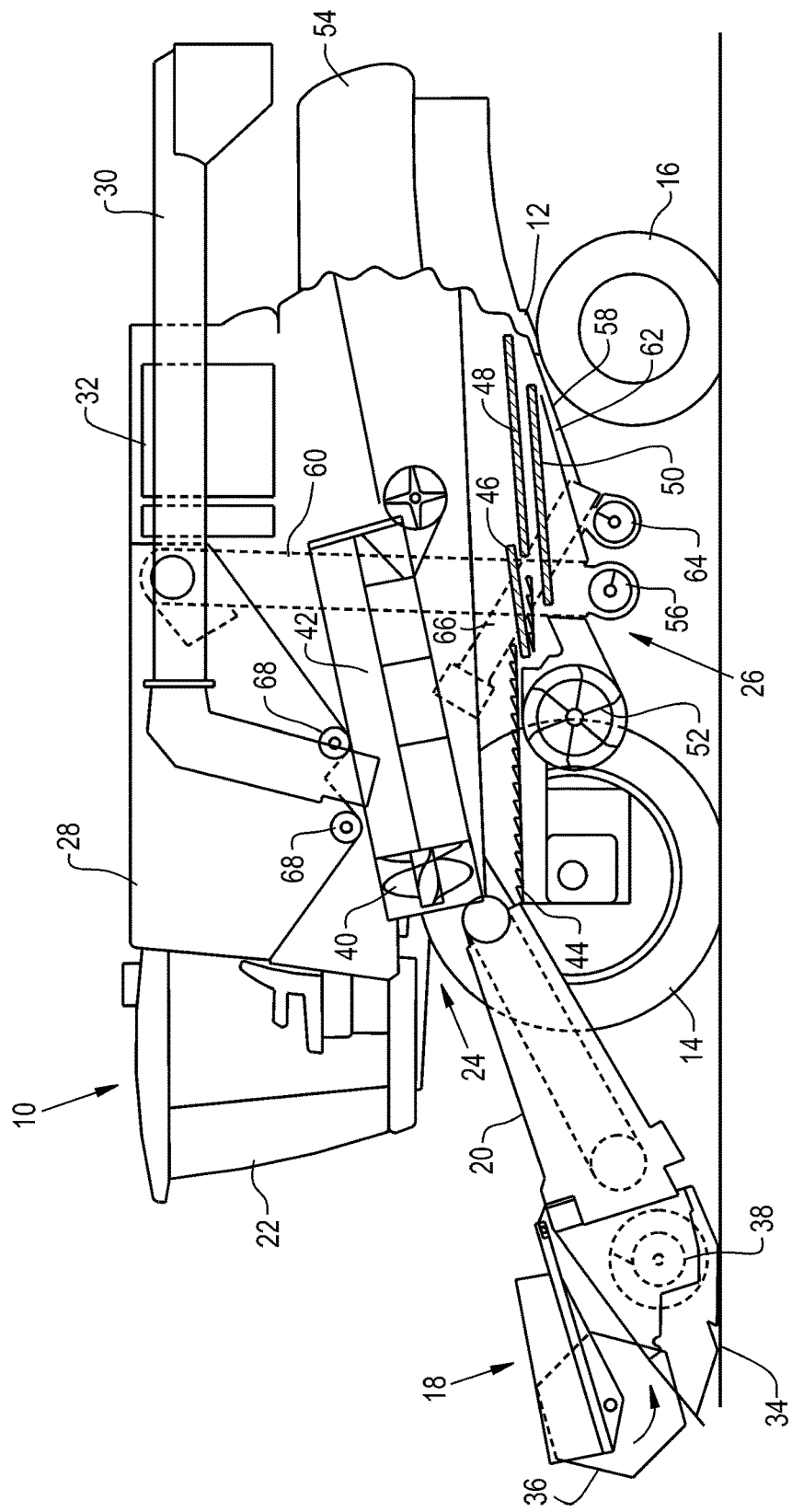
FIG. 1 is a side view of an embodiment of an agricultural harvester in the form of a combine which may include a sieve assembly of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
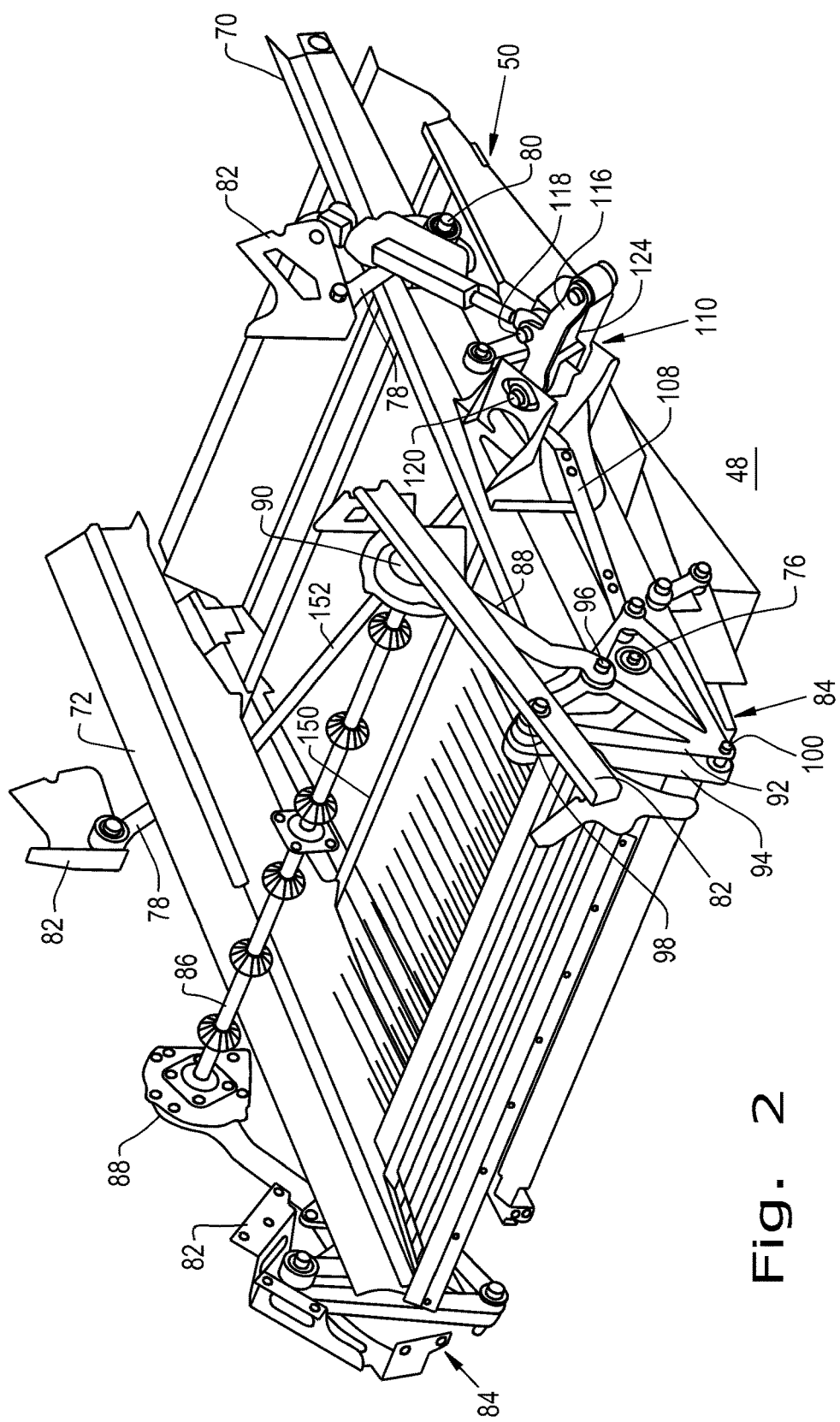
FIG. 2 is a perspective view of a sieve assembly embodying the present invention.

Referring now to FIG. 2, the upper and lower sieves or sieve assemblies 48 and 50 are shown. The upper sieve assembly 48 includes a left rail or frame 70 and a right rail or frame 72 interconnected by a cross frame 74. The right and left frames 70 and 72 are supported at the cross frame 74 by a front pivot support 76. A flexible link 78 connects to a rear support to guide the rails in a fore and aft movement. Support frames 82 (see FIG. 2) provide a base affixed to the chassis 12 to provide ultimate support for the sieve assembly 48. A sieve extends between right and left frames 70 and 72 to provide a surface for carrying material in an aft direction and permit grain or other crop material to drop through and be collected. The sieve is not shown to enable a clearer description of the present invention.

Figure 3:
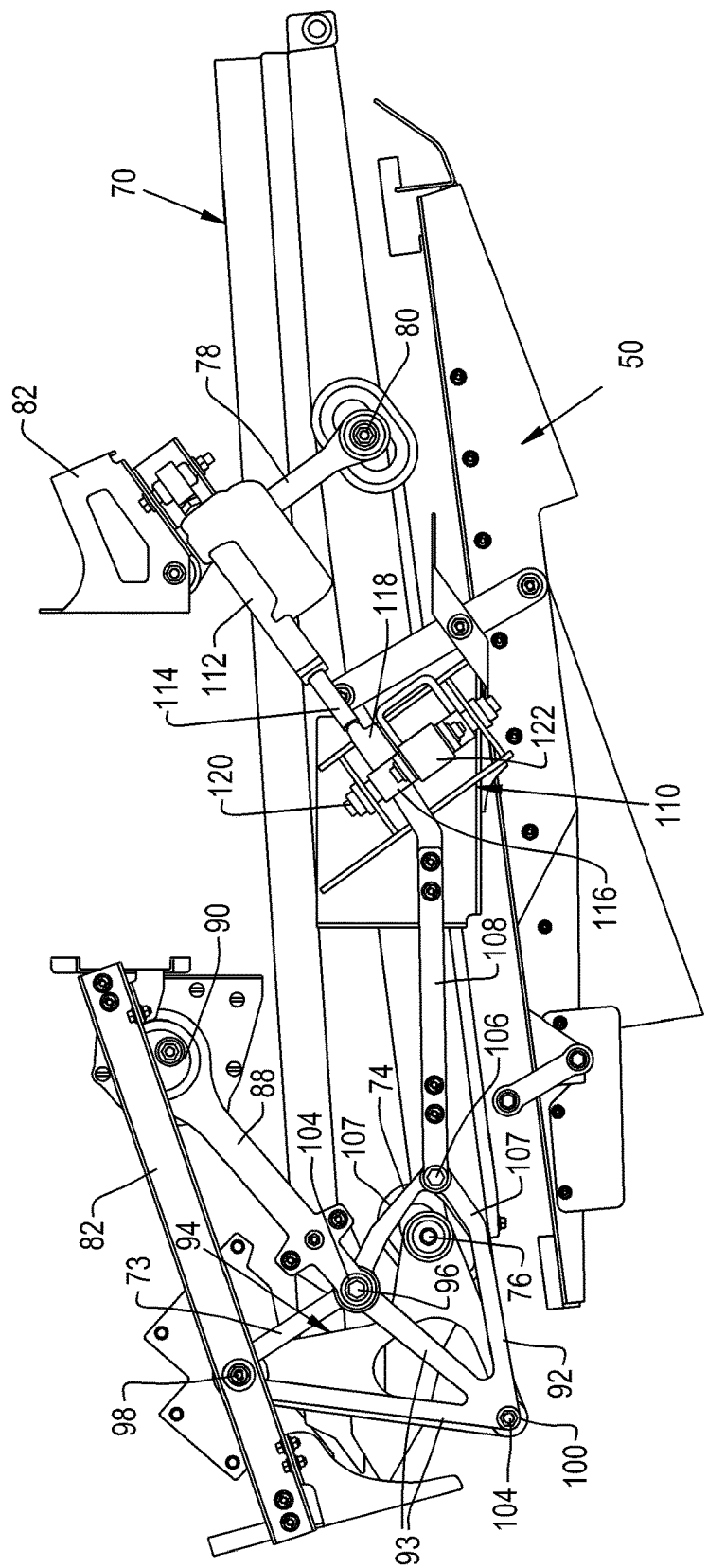
FIG. 3 is a side view of the sieve assembly of FIG. 2.
Figure 4:
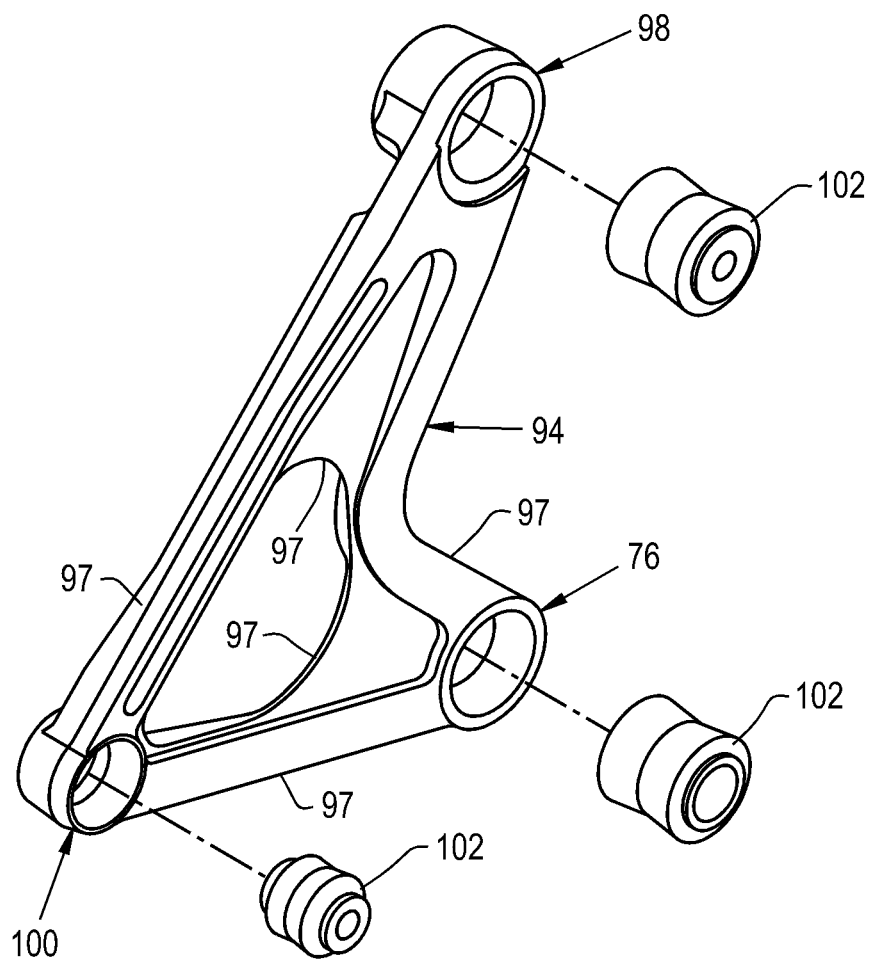
FIG. 4 is a detailed view of a support frame for the sieve assembly of FIGS. 2 and 3.

The front of the right and left frames 70 and 72 are mounted for fore and aft movement through a fore and aft oscillation mechanism generally indicated at 84. An input drive shaft 86 extending transverse in chassis 12 receives a suitable power input for rotation. Both ends of drive shaft drive 86 reciprocate arm 88 through an eccentric mounting 90. Arm 88 connects to a first member 92 through a pivotal connection 96. A pivotal mounting 98 mounts the first member 92 and a second member 94 adjacent to it in radially inward from the first member 92. A frame interconnection 100 connects the first and second members 92 and 94. The second member 94 has a plurality of flexible rubber bushings 102 as shown particularly in FIG. 4. A plurality of rubber bushings 104, particularly shown in FIG. 3, enables an interconnection between the first and second members 92 and 94. As shown in FIGS. 2, 3 and 4, the pivotal connections 76 (second member 94), common pivotal interconnections 98, 100 and pivotal connection 96 (first member 92) form triangles with two sides common and the third independent. Also, the members 92 and 94 are formed generally as legs 93 and 95 connecting the pivotal mounting points, with one of the legs 95 being curved for clearance purposes. Webs 97 structurally reinforce the legs of frame 94. Preferably, members 92 and 94 are cast.

A pivotal connection 106 on first member 92 through legs 107 connects with a link 108 that drives the lower sieve 50 for reciprocating movement. Details of this arrangement are not included to enable a better focus on the invention.

The right and left frames 70 and 72 are selectively reciprocated from side to side by a side shaker mechanism generally indicated at 110. The mechanism includes a reciprocating electric actuator 112 appropriately mounted to frame 82 and having an output shaft 114 connecting to upper and lower links 116 by a pivotal input connection 118. The upper and lower links 116 are pivotally connected to the frame 82 at 120. A bushing 122, integral with a connecting rod 124 connects the links 116. The connecting rod 124 extends to a structural connection for tying the right frame 92 and left frame 94 together for side to side movement.

Figure 5:
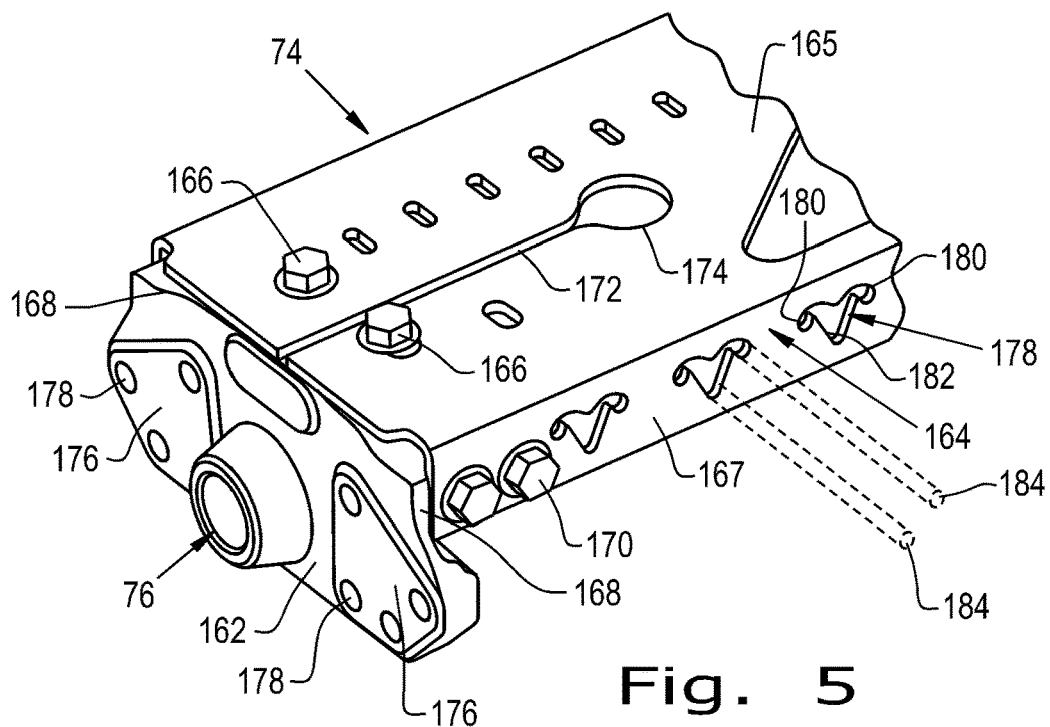
FIG. 5 is a perspective view of a cross frame incorporated in the sieve assembly of FIGS. 2 and 3; and, FIG. 6 is a perspective view of the under side of the cross frame member of FIG. 5.
Figure 6:
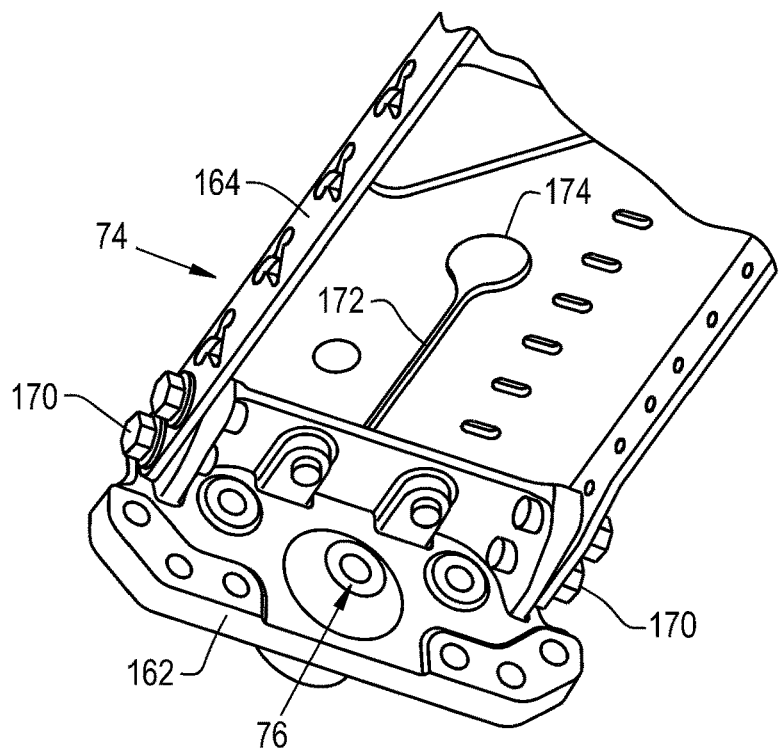

The cross frame member 74 is shown in detail in FIGS. 5 and 6. The cross frame member has end castings 162 for connection to the right and left frames 70 and 72. An elongated bent edge sheet metal member 164 extends between the castings 162. The sheet metal member 164 has a center section 165 and side sections 167 bent at 90° to the plane of the center section 165. The sheet metal member 164 abuts correspondingly shaped mounting surfaces 168 on castings 162. Screws 166 fasten the center section 165 to the corresponding mounting surface on casting 162 and screws 170 fasten the side sections 167 to the corresponding mounting surfaces 168 of casting 162. The end castings 162 each have a longitudinally extending hole forming the pivotal mounting 76 for the sieve assembly 48. While the sheet metal member 164 is shown as having a U-shaped cross section, it may be in other forms such as a single bent edge or a Z-shape.

In accordance with the present invention, a longitudinal slot 172 is provided in the center section 165 to separate the mounting of screws 166 and 170. The slot 172 terminates in a circular hole 174 provided in center section 165 to dissipate stresses. Mounting bosses 176 provide a surface with which to connect to the right and left frames 70 and 72. Mounting bosses 176 may have threaded holes 178 providing a mounting by means of screws (not shown).

By providing the slot 172 in the center section 165 of the sheet metal member 164, any variations in the tolerances of the bending process may be easily accommodated. This is the case when the sheet metal member is either bigger or smaller than the corresponding mounting surfaces 168 on the castings 162. The circular hole 174 provides further dissipation of the stresses involved when fitting the sheet member 164 to the end castings 162.

Additionally, the side section 167 shown in FIG. 5 has a plurality of closed slots 178 for removeably retaining wire fingers shown in dashed lines as 184. Closed slots 178 each have a pair of opposed holding notches 180 interconnected by a V shape 182.

By providing closed slots 178, stresses associated with a prior open slot are avoided. The holding notches 180 and V shape 182 provide a sufficient opening to insert the wire fingers 184 and twist them into place into the notches 180.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve assembly for an agricultural harvester, said sieve assembly comprising:
   a right frame and a left frame interconnected by a cross frame;
   said cross frame comprising a casting on either end for connection to said right and left frames;
   an elongated bent edge sheet metal member affixed to said castings, said sheet metal member having a longitudinal slot in the end for accommodating variations in geometry; and,
   fasteners for connecting said sheet metal member to said end castings on opposite sides of said slot; and,
   wherein said elongated slot terminates in a rounded hole.

2. The sieve assembly as claimed in claim 1, wherein said casting comprises threaded holes and said fasteners are screws threaded into said threaded holes.

3. The sieve assembly as claimed in claim 2, wherein said casting has an upper surface and side surface, each with threaded holes therein and said sheet metal member has holes corresponding to said threaded holes in said casting.

4. The sieve assembly as claimed in claim 3, wherein said casting has formed therein a longitudinally extending hole forming a pivotal mounting for said sieve assembly.

5. The sieve assembly as claimed in claim 4, wherein said castings have mounting bosses adjacent the longitudinal hole for mounting to said right and left frames.

6. The sieve assembly as claimed in claim 1, wherein said sheet metal member has a U-shaped cross section.

7. A harvester comprising:
   a chassis;
   a plurality of wheels for ground movement;
   grain processing equipment mounted in said chassis;
   a sieve assembly comprising a right frame and a left frame interconnected by a cross frame;
   said cross frame comprising:
     a casting on either end for connection to said right and left frames;
     an elongated bent edge sheet metal member affixed to said castings, said sheet metal member having a longitudinal slot in the ends thereof for accommodating variations and geometry; and,
     fasteners for connecting said sheet metal member to said end castings on opposite sides of said slot; and
     wherein said elongated slot terminates in a round hole.

8. The agricultural harvester as claimed in claim 7, wherein said castings have threaded holes and said fasteners are threaded into said holes for securing said sheet metal member to said castings.

9. The agricultural harvester as claimed in claim 8, wherein said casting has an upper surface and side surfaces with threaded holes in each and said sheet metal member has holes corresponding to said threaded holes.

10. The agricultural harvester as claimed in claim 9, wherein said casting further comprises a longitudinally directed hole forming a pivotal mounting for said sieve assembly.

11. The agricultural harvester as claimed in claim 10, further comprising mounting bosses on said casting adjacent said longitudinal hull for securing to said right and left frames.

12. The agricultural harvester as claimed in claim 7, wherein said sheet metal member has a U-shaped cross section.

13. A harvester comprising:
a chassis;
a plurality of wheels for ground movement;
grain processing equipment mounted in said chassis;
a sieve assembly comprising a right frame and a left frame interconnected by a cross frame;
said cross frame comprising:
   a casting on either end for connection to said right and left frames;
   an elongated bent edge sheet metal member affixed to said castings, said sheet metal member having a longitudinal slot in the ends thereof for accommodating variations and geometry; and,
fasteners for connecting said sheet metal member to said end castings on opposite sides of said slot;
wherein said elongated sheet metal member has a side section with a plurality of closed slots for releasably retaining wire fingers.

14. The agricultural harvester as claimed in claim 13, wherein said closed slots comprise holding notches interconnected by a V shape for permitting installation of said wire fingers.

* * * * *